United States Patent
Chutorash

(10) Patent No.: US 6,314,351 B1
(45) Date of Patent: Nov. 6, 2001

(54) AUTO PC FIREWALL

(75) Inventor: Richard J. Chutorash, Rochester Hills, MI (US)

(73) Assignee: Lear Automotive Dearborn, Inc., Southfield, MI (US)

( * ) Notice: Subject to any disclaimer, the term of this patent is extended or adjusted under 35 U.S.C. 154(b) by 0 days.

(21) Appl. No.: 09/131,540

(22) Filed: Aug. 10, 1998

(51) Int. Cl.[7] ........................................ G06F 7/00
(52) U.S. Cl. ........................ 701/36; 307/10.1; 340/825.3; 340/825.34
(58) Field of Search ............................ 701/1, 29, 33–36; 307/9.1–10.5; 340/425.5, 825.3, 825.31, 825.34, 459, 461; 380/28

(56) References Cited

U.S. PATENT DOCUMENTS

| | | | |
|---|---|---|---|
| 5,363,448 | 11/1994 | Koopman, Jr. et al. | 380/23 |
| 5,377,270 | 12/1994 | Koopman, Jr. et al. | 380/25 |
| 5,398,284 | 3/1995 | Koopman, Jr. et al. | 380/28 |
| 5,416,842 | 5/1995 | Aziz | 380/30 |
| 5,555,502 | 9/1996 | Opel | 701/36 |
| 5,598,476 | 1/1997 | LaBarre et al. | 380/23 |
| 5,619,575 | 4/1997 | Koopman, Jr. et al. | 380/28 |
| 5,649,014 | 7/1997 | Koopman, Jr. et al. | 380/28 |
| 5,696,828 | 12/1997 | Koopman, Jr. | 380/46 |
| 5,757,923 | 5/1998 | Koopman, Jr. | 380/46 |
| 5,787,367 | * 7/1998 | Berra | 701/1 |
| 5,991,673 | * 11/1999 | Koopman, Jr. et al. | 701/32 |
| 6,020,654 | * 2/2000 | Chutorash | 307/10.1 |
| 6,032,089 | * 2/2000 | Buckley | 701/36 |

FOREIGN PATENT DOCUMENTS 0 392 411 A   10/1990   (EP) .

OTHER PUBLICATIONS

Ted Doty, "A Firewall Overview", from ConneXions, vol. 9, No. 7, pp. 20–23, Jul. 1995.

* cited by examiner

Primary Examiner—William A. Cuchlinski, Jr.
Assistant Examiner—Edward Pipala
(74) Attorney, Agent, or Firm—Niro, Scavone, Haller & Niro

(57) ABSTRACT

A vehicle computer system provides a firewall between an auto PC and its application software and the vehicle bus and vehicle components. The firewall prevents unauthorized access by software in the auto PC to the vehicle bus and vehicle components. Preferably, the firewall utilizes encryption technology within the handshake between the auto PC software and firewall.

20 Claims, 1 Drawing Sheet

AUTO PC FIREWALL

BACKGROUND OF THE INVENTION

The present invention relates to computers for automotive vehicles and more particularly to a firewall for protecting vehicle functions from unauthorized access.

It is known to provide a vehicle with a personal computer or "auto PC" which provides a user interface to vehicle functions, such as climate control, audio system, power windows, windshield wipers, etc. In order to provide these features, the auto PC must have access to the vehicle bus. Many vehicle components, including the engine control module, send and receive information and commands via the vehicle bus. Since the auto PC will permit the installation of third party software, unauthorized access to the vehicle bus is a concern. Unauthorized access to the vehicle bus could cause undesirable control of vehicle components. More importantly, unauthorized access to the vehicle bus could impair critical functions of the vehicle, such as the engine control system or braking system.

SUMMARY OF THE INVENTION

The present invention provides a system and method for preventing unauthorized access by software in the auto PC to the vehicle bus or directly to vehicle components. This accomplished by a firewall between the auto PC software and vehicle bus. The firewall may be implemented solely in software in the auto PC itself, or may comprise a separate hardware module. Preferably, the firewall utilizes encryption handshaking with auto PC software in the firewall.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
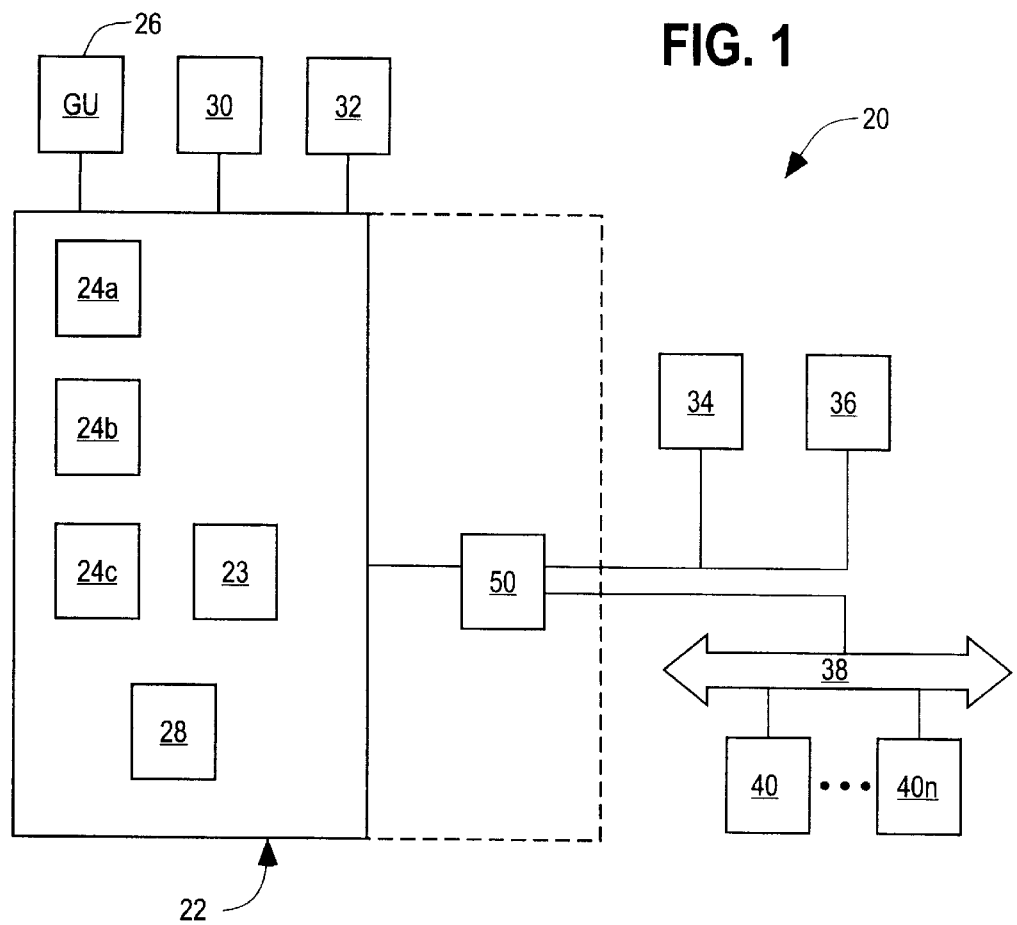
FIG. 1 is a schematic of the present invention.

A vehicle computer system 20 is shown schematically in FIG. 1 comprising an auto PC 22, which generally comprises a CPU 23 executing application software 24a–c. Application software 24a–c each comprise code executable by the CPU 23 for providing any of the functions described herein or any of the functions well known to those in the art to be provided by the auto PC. It should also be understood that other software necessary to perform the functions described herein would also be included and that those reasonably skilled in the art would be able to create such software for performing these functions. Software 24a–c specifically refers to application software that would provide access to and control of vehicle components via a graphical user interface 26. The auto PC 22 may also include a feature board 28. Auto PC 22 may also receive input from devices 30 and 32.

As is known to those familiar with the auto PC concept, the auto PC 22 provides a graphical user interface 26 for receiving information from and providing commands to vehicle components 34, 36, 38 and 40–40n. As is shown in FIG. 1, vehicle component 38 is specifically a vehicle bus 38 which in turn provides access to vehicle components 40–40n. Vehicle components 34 and 36 represent any vehicle components which are not accessible via the vehicle bus 38, but are accessed directly by the auto PC.

Generally, vehicle components 34, 36 and 40–40n would include climate control systems, cellular phone, navigation system, audio system, digital video disc system, power windows, windshield wipers, suspension system, engine control system, automatic braking system. Other vehicle components to which convenient access could be provided via the auto PC 22 could also be included. Preferably most of these components 40–40n would be accessible via the vehicle bus 38; however, other vehicle components 34, 36 may be accessed directly and not be accessible via the vehicle bus 38.

Since one of the features of the auto PC 22 is an open platform, the present invention provides a firewall 50 between the application software 24a–c and the vehicle components 34, 36, 38 and 40–40n. The firewall 50 insures that the application software 24a–c is authorized before permitting the application software 24a–c to send commands to any of the vehicle components 34, 36, 38 and 40–40n. The firewall 50 may comprise a separate chip or separate hardware connected between the auto PC 22 and the vehicle components 34, 36 and 38. Preferably, however, the firewall 50 is implemented in software run by the CPU 23 in the auto PC 22.

When application software 24 wishes to access one of the vehicle components, it first initiates handshake with the firewall 50. Preferably this handshake is similar to that used in some remote keyless entry systems. The application software 24 sends a code to the firewall 50. The firewall 50 evaluates the code to determine if it is a valid code. If so, the firewall 50 relays the command to the appropriate vehicle component.

Most preferably, the codes from the application software 24 are encrypted utilizing random or pseudorandom number generation techniques known in remote keyless entry systems. Preferred code encryption techniques are more fully disclosed in the following U.S. Pat. No. 5,619,575 Koopman, Jr. et al., U.S. Pat. No. 5,649,014 Koopman, Jr. et al., U.S. Pat. No. 5,696,828 Koopman, Jr., U.S. Pat. No. 5,757,923 Koopman, Jr., U.S. Pat. No. 5,598,476 Koopman, Jr. et al., U.S. Pat. No. 5,398,284 Koopman, Jr. et al., U.S. Pat. No. 5,377,270 Koopman, Jr. et al., and U.S. Pat. No. 5,363,448 Koopman, Jr. et al. all of which are assigned to the assignee of the present invention and which are hereby incorporated by reference.

Figure 2:
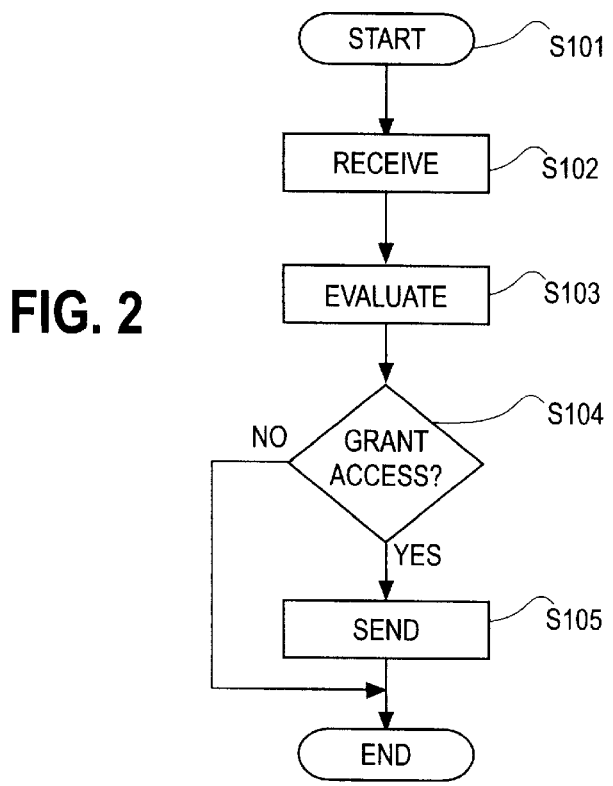
FIG. 2 is a flowchart of an operation in the circuit of FIG. 1.

FIG. 2 is a flowchart of an operation in the circuit of FIG. 1 representing an interrupt in response to a user input from a user interface to cause a command with an encrypted code to be generated. The operation starts at step S101 and goes to step S102 wherein the command and the encrypted code are received. In step S103, the code is evaluated (e.g. decrypted and checked for authorization) and in step S104, it is determined whether access is granted. In step S105, if access is granted, the command is sent onto the vehicle bus. Then, or after step S104 if access is not granted, the operation ends.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A system mounted in a vehicle for enabling a user to control a component of the vehicle, said system comprising:

a computer having a CPU;

application software installed in said computer; said software comprising code executable by said CPU for controlling the component by said computer generating a command sendable to the component;

a user interface connected to said computer for generating an input indicative of a function of the component in response to actuation by the user, said application software receiving said input; and a firewall, wherein said system is responsive to said firewall to selectively send the command to the component, said system sending the command to the component after receipt of said input by said application software only if said firewall has ensured that said application software is authorized to send the command.

2. The system of claim 1, wherein when said application software receives said input, said application software generates a code and said command and sends said code and said command to said firewall, said firewall sending said command to the component only if said code indicates that said application software is authorized.

3. The system of claim 2, wherein said code is sent to said firewall as an encrypted part of a handshaking procedure.

4. The system of claim 3, wherein the vehicle includes a vehicle bus connected to the component, and wherein said system prevents said command from being sent onto the vehicle bus if said firewall determines that said application software is not authorized.

5. The system of claim 1, wherein the vehicle includes a vehicle bus connected to the component, and wherein said system prevents said command from being sent onto the vehicle bus if said firewall determines that said application software is not authorized.

6. The system of claim 1, wherein the component is a climate control system and said input to said user interface is for controlling the climate control system.

7. The system of claim 1, wherein the component is an audio system and said input to said user interface is for controlling the audio system.

8. The system of claim 1, wherein said firewall comprises software in said computer.

9. The system of claim 1, wherein said firewall comprises hardware connected between said computer and the component.

10. The system of claim 9, wherein the vehicle includes a vehicle bus connected between said firewall and the component, wherein said application software sends said command to said firewall and wherein said firewall prevents said command from being sent onto the vehicle bus if said firewall determines that said application software is not authorized.

11. A method for preventing unauthorized access to a vehicle component using a system mounted in the vehicle for enabling a user to control the component, the system comprising a computer having a CPU, application software installed in the computer; the software comprising code executable by said CPU for controlling the component, said method comprising the steps of:

generating an input indicative of a function of the component in response to actuation by the user of a user interface connected to the computer;

sending the input to the application software;

generating a command sendable to the component in the application software by the computer; and responsive to a firewall, selectively sending the command to the component, said method sending the command to the component after receipt of the input by the application software only if the firewall has ensured that the application software is authorized to send the command.

12. The method of claim 11, wherein when the application software receives the input, said generating step in the application software generates a code and the command and sends the code and the command to the firewall, and said selective sending step sends the command from the firewall to the component only if the code indicates that the application software is authorized.

13. The method of claim 12, wherein the code is sent to the firewall as an encrypted part of a handshaking procedure.

14. The method of claim 13, wherein the vehicle includes a vehicle bus connected to the component, and wherein said selective sending step prevents the command from being sent onto the vehicle bus if the firewall determines that the application software is not authorized.

15. The method of claim 11, wherein the vehicle includes a vehicle bus connected to the component, and wherein said selective sending step prevents the command from being sent onto the vehicle bus if the firewall determines that the application software is not authorized.

16. The method of claim 11, wherein the component is a climate control system and the input to the user interface is for controlling the climate control system.

17. The method of claim 11, wherein the component is an audio system and the input to the user interface is for controlling the audio system.

18. The method of claim 11, wherein the firewall comprises software in the computer.

19. The method of claim 11, wherein the firewall comprises hardware connected between the computer and the component.

20. The method of claim 19, wherein the vehicle includes a vehicle bus connected between the firewall and the component, wherein the application software sends the command to the firewall and wherein the firewall prevents the command from being sent onto the vehicle bus if the firewall determines that the application software is not authorized.

* * * * *